United States Patent [19]
Sakamoto et al.

[11] Patent Number: 5,483,319
[45] Date of Patent: Jan. 9, 1996

[54] CAMERA CAPABLE OF PHOTOGRAPHING WITH FLASH

[75] Inventors: Hiroshi Sakamoto, Kawasaki; Nobuyoshi Hagiuda, Yokohama; Hideki Matsui, Fujisawa; Ryotaro Takayanagi, Yokohama, all of Japan

[73] Assignee: Nikon Corporation, Tokyo, Japan

[21] Appl. No.: 391,471

[22] Filed: Feb. 21, 1995

Related U.S. Application Data

[63] Continuation of Ser. No. 102,760, Aug. 6, 1993, abandoned.

[30] Foreign Application Priority Data

Aug. 25, 1992 [JP] Japan ................................ 4-226029
Sep. 14, 1992 [JP] Japan ................................ 4-064130 U

[51] Int. Cl.$^6$ ....................................................... G03B 7/00
[52] U.S. Cl. ........................................................... 354/415
[58] Field of Search ..................................... 354/129, 137, 354/138, 146, 147, 245–249, 413, 415, 456, 457, 459

[56] References Cited

U.S. PATENT DOCUMENTS 5,264,894 11/1993 Kobayashi et al. .................... 354/415

*Primary Examiner*—David M. Gray
*Attorney, Agent, or Firm*—Oliff & Berridge

[57] ABSTRACT

A camera capable of photographing with flash comprises a pre-flash command circuitry 11 which commands a pre-flash used for curtailing red eye; rear synchronized photography command circuitry 25 which commands a rear synchronized photography; a microcomputer 22 which, when no command is being given to the pre-flash, and when rear synchronized photography is being commanded, causes a light discharge unit 24 to perform the primary flash with the first timing in response to the release of the shutter, and which when the pre-flash is being commanded, causes the light discharge unit 24 to perform the pre-flash prior to the release of the shutter, notwithstanding a command for synchronized photography, and; notwithstanding the existence or lack of a pre-flash command, if there is no command for rear synchronized photography, in response to the release of the shutter, causes the light discharge unit 24 to perform the primary flash with the secondary timing which is faster than the first timing; when both the pre-flash and the rear synchronized photography are commanded, the primary flash is accomplished with the first timing which is continuous with the pre-flash.

8 Claims, 8 Drawing Sheets

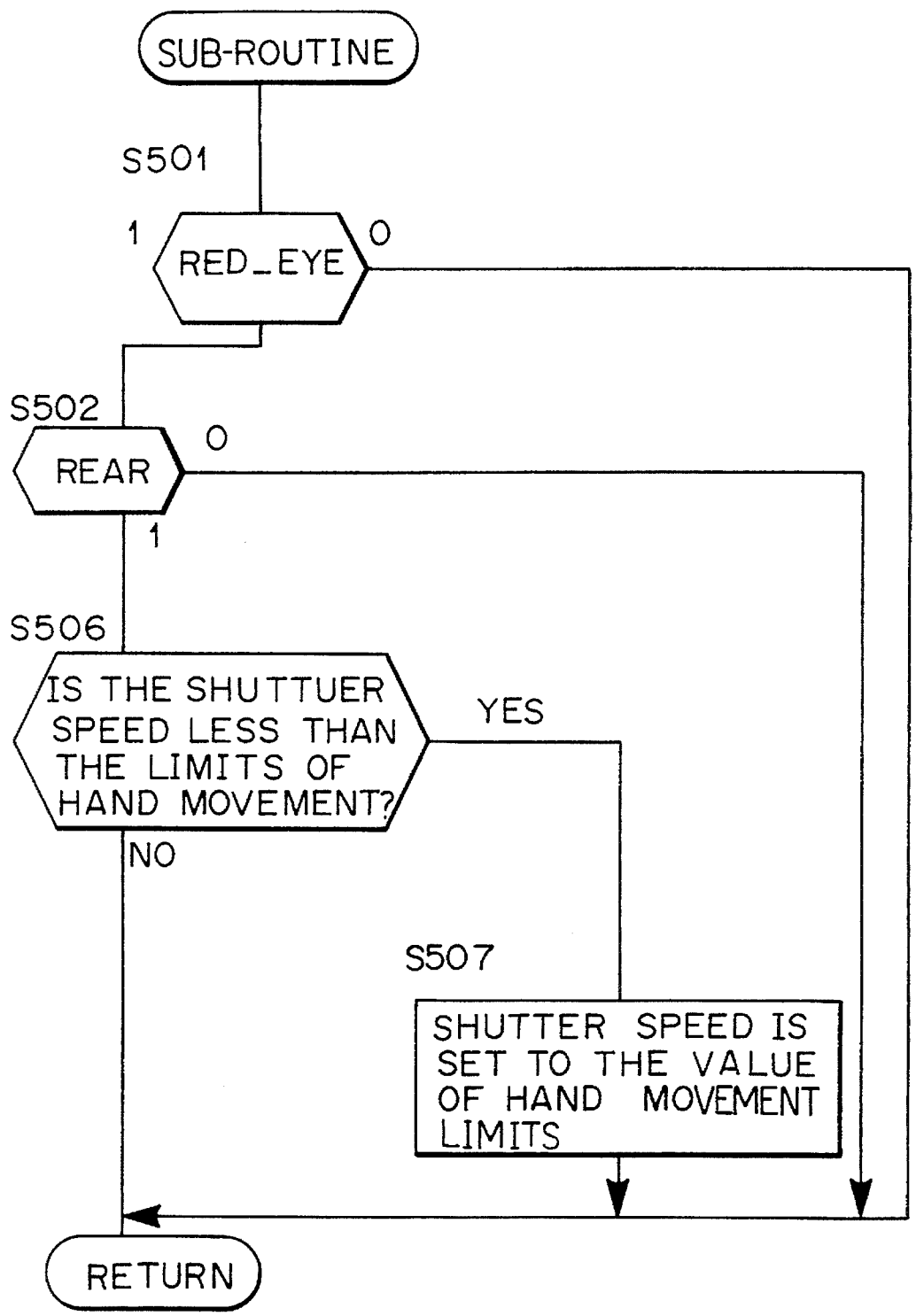

CAMERA CAPABLE OF PHOTOGRAPHING WITH FLASH

This is a Continuation of application Ser. No. 08/102,760 filed Aug. 6, 1993, now abandoned.

BACKGROUND OF THE INVENTION

1. Field of the Invention

This invention relates to a camera which is capable of a pre-flash for reducing red-eye, and rear synchronized photography.

2. Description of the Related Art

Under the conventional art, in order to prevent the eyes of the subject being flash photographed from taking on a red appearance due to what is known as the red eye phenomenon, some cameras are known which produce a pre-flash which precedes the taking of the photograph in order to prevent the occurrence of the red eye phenomenon. With such cameras, when the command is given for the pre-flash, when the release button is actuated the electronic flash mechanism first performs the pre-flash, followed by the actuation of the primary electronic flash. By this means, a contraction of the pupils of the eyes of the subject being photographed is caused by the pre-flash, following which the ordinary flash photography is accomplished, resulting in a picture in which there is no appearance of red eye.

On the other hand, with single lens reflex cameras, photography in which utilization is made of a synchronized rear focal plane curtain is well known. With rear focal plane curtain synchronized photography, the electronic flash is discharged immediately prior to the movement of the rear curtain of the focal plain shutter (ordinarily with the front curtain synchronized photography a flash is released immediately following the completion of the movement of the front curtain), resulting in the creation of an image which extends rearward as an after image if there is movement on the part of the subject being photographed.

However, if the pre-flash utilized to curtail red eye and the rear focal plane curtain synchronized photography are simultaneously accomplished when taking a flash photograph, the following problem may occur.

Generally, with rear curtain synchronized photography, good results are obtained through the utilization of slower shutter speeds. Therefore, the time gap between the pre-flash and the primary flash becomes lengthened, and once the pupils of the subject being photographed have become narrowed by the pre-flash, the primary flash may occur after they have once again become dilated, thereby preventing a satisfactory curtailment of red eye. In addition, since the period of flash discharge is extended, on seeing the pre-flash, the individual being photographed may think that the picture has already been taken before the primary flash, and may prematurely relax his pose.

SUMMARY OF THE INVENTION

An objective of this invention is to provide a camera capable photographing with flash in which the execution of the pre-flash and rear curtain synchronized photography can be respectively prevented at a given time during the photograph, during which the other is accomplished.

In order to accomplish this objective, the camera according to this invention comprises: a flash means which performs both a red eye curtailment pre-flash and a primary subject illumination flash; a pre-flash command means to command the pre-flash; a pre-flash control means which causes the pre-flash in advance of the release of the shutter when the pre-flash is so commanded; a rear curtain synchronization command means which commands the rear synchronized photography; a primary flash control means which, when the rear synchronized photography is being commanded, causes the flash means to perform the primary flash with a first timing, and in response to the release of the shutter, and which, when there is no command for rear synchronized photography, causes the flash means to perform the primary flash with a second timing, which is faster than the first timing, in response to the release of the shutter; and a prevention means which, even when there is a command for both the pre-flash and for rear synchronized photography, the occurrence of either the pre-flash by means of the pre-flash control means, or the first flash with the first timing by the flash control means is prevented.

When commands are simultaneously issued for both the pre-flash and for rear synchronized photography, either the first timing flash accomplished by the primary flash control means may be prevented, or the pre-flash accomplished by the pre-flash control means may be prevented.

When there is a command for the pre-flash before there is a command for rear synchronized photography, the first timing flash by means of the primary flash control means may be prevented. By the same token, when there is a command for rear synchronized photography before, even if there is a command for the pre-flash, the pre-flash may be prevented by the pre-flash control means.

Also, when rear synchronized photography is commanded after a command for the pre-flash, the pre-flash by the pre-flash control means may be prevented. By the same token, if a command for the pre-flash is commanded after a command for rear synchronized photography, the first timing flash by the primary flash control means may be prevented.

In addition, the cited objectives can be achieved by a camera in which shutter speeds above a specified value can be established, even when commands are given for both the pre-flash and for rear synchronized photography. It is best for the timing of the high shutter speeds to be established on the basis of the maximum values with which the pupils of the photographic subject, which have been constricted by means of the pre-flash, manifest effective red eye curtailment.

When commands are given for both the pre-flash, and for rear synchronized photography, the shutter speed may be established at either the value synchronized with the flash, or being roughly inverse to the focal length of the photographic lens.

With this type of camera, when commands are issued both for the pre-flash and for rear synchronized photography, since shutter speeds are established at high speeds above specified values, there is no extension in the time gap between the pre-flash and that of the primary flash, as a consequence of which satisfactory red eye curtailment can be accomplished, while eliminating the possibility that the photographic subject may erroneously sense the completion of the photograph prior to the primary flash.

BRIEF DESCRIPTION OF THE DRAWINGS

FIG. 8 is a flow chart which explains the operation of a sixth embodiment.

DETAILED DESCRIPTION OF PREFERRED EMBODIMENTS

Explanations of the first through sixth embodiments are provided hereafter with reference to the FIGS. 1–8.

First of all an explanation will be given with respect to those compositional elements which are common to each of the embodiments.

Figure 1:
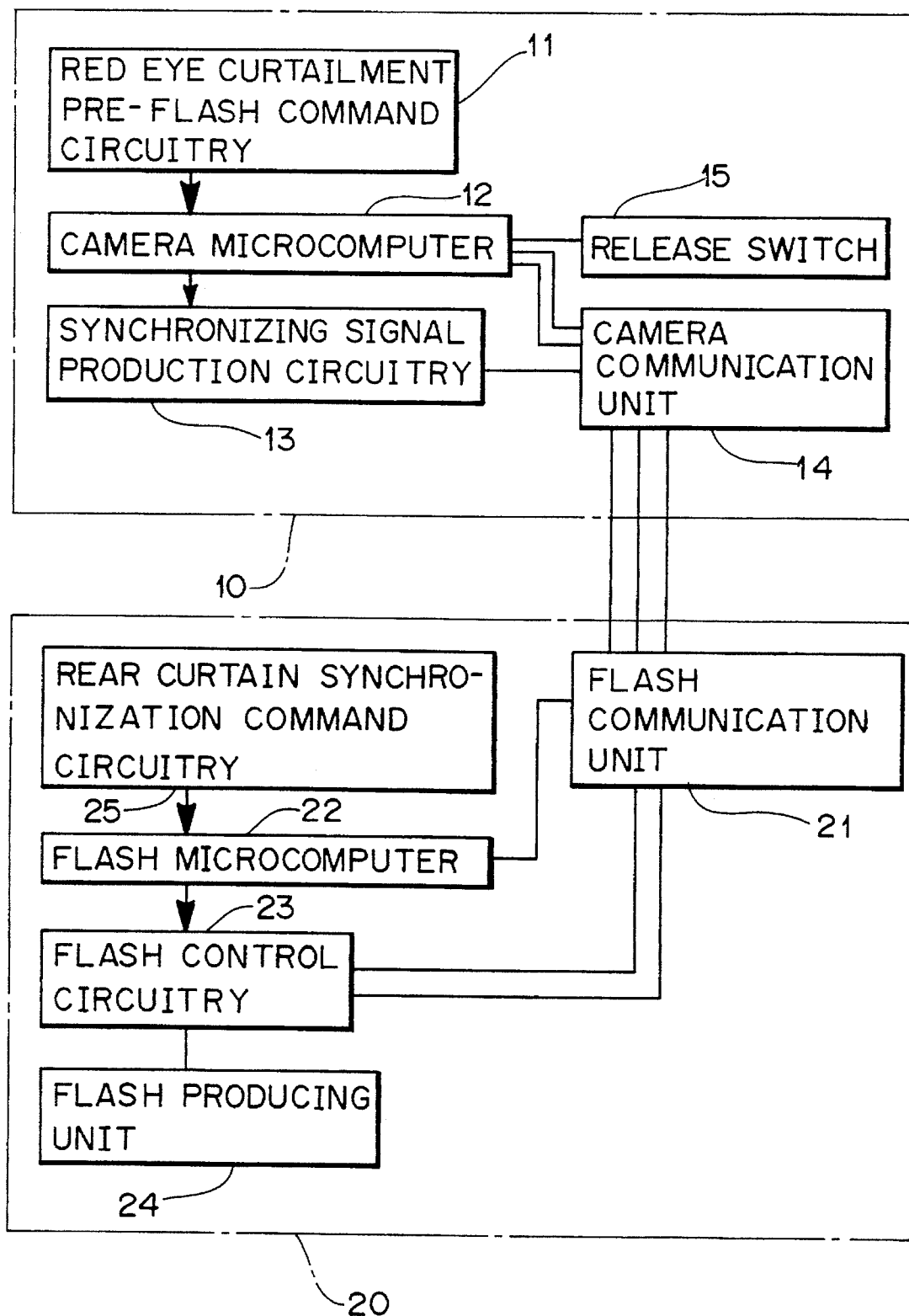
FIG. 1 is a block diagram which shows the composition of a camera capable of photographing with flash according to an embodiment of this invention.

FIG. 1 is a block diagram which shows an embodiment of a flash camera according to this invention, wherein 10 represents a camera body, and 20 represents an electronic flash which is externally mounted on the camera body 10.

On the camera body 10, a red-eye curtailment pre-flash command circuitry 11 establishes the presence or lack of a red-eye curtailment flash command according to the action of an operational unit (not shown), the essentials of which are input into a camera microcomputer 12. In the program mode, for example, the construction can be made of command circuitry 11 to automatically set the pre-flash without the action of the operational unit, or to establish the pre-flash on the basis of information known about conditions which tend to cause red eye.

A synchronizing signal producing circuitry 13 produces a synchronized signal to control the timing of the flash in response to a command issued by the camera's microcomputer 12. The synchronizing signal signals the detection of complete opening of the forward curtain of the focal plane shutter, when there is no command for rear curtain synchronized photography given by a rear curtain synchronized photographic command circuitry 25, explained hereafter, i.e. when a command is issued for front curtain synchronized, and signals the detection of the commencement of movement by the rear curtain when a command is issued for rear curtain synchronized photography.

A camera communication component 14 transmits the synchronizing signal and the mobilization signal for the red eye curtailing pre-flash from the camera microcomputer 12 to the electronic flash unit 20. Moreover, a serial interface is provided though which information regarding flags or data can be exchanged between the electronic flash unit 20 and the microcomputer 12, transmissions being accomplished with regard to whether or not there has been an establishment of pre-flash, or rear curtain synchronized photography. 15 represents a release switch in the diagrams.

In this instance, when in the exposure control mode, the camera microcomputer 12 calculates the stop value and shutter speed on the basis of the illumination of the photographic subject, by means of a light meter, not shown and film sensitivity data input from the DX contact point, and the results thus calculated are recorded into memory. In addition, in the shutter priority mode, or in the manual exposure mode, the manually input shutter speed is recorded into memory.

On the other hand, with the electronic flash 20, a flash communication unit 21 is an interface which communicates with the camera communication unit 14, information from the camera being input into a flash microcomputer 22, or a flash control circuitry 23. Flash control circuitry 23 outputs a trigger signal to the discharge tube of a flash unit 24 in response to the synchronized signal or the pre-flash mobilization signal, causing the discharge of and regulating the light of the flash. Since the rear curtain synchronization photographic command circuitry 25 issues a command for rear curtain synchronized photography in response to the action of an operational unit (not shown), data indicating the existence or lack of the establishment of a command is input into the flash unit microcomputer 22, at the same time being transmitted to the camera microcomputer 12 through flash communication unit 21 and the camera communication unit 14.

FIRST EMBODIMENT

Figure 2:
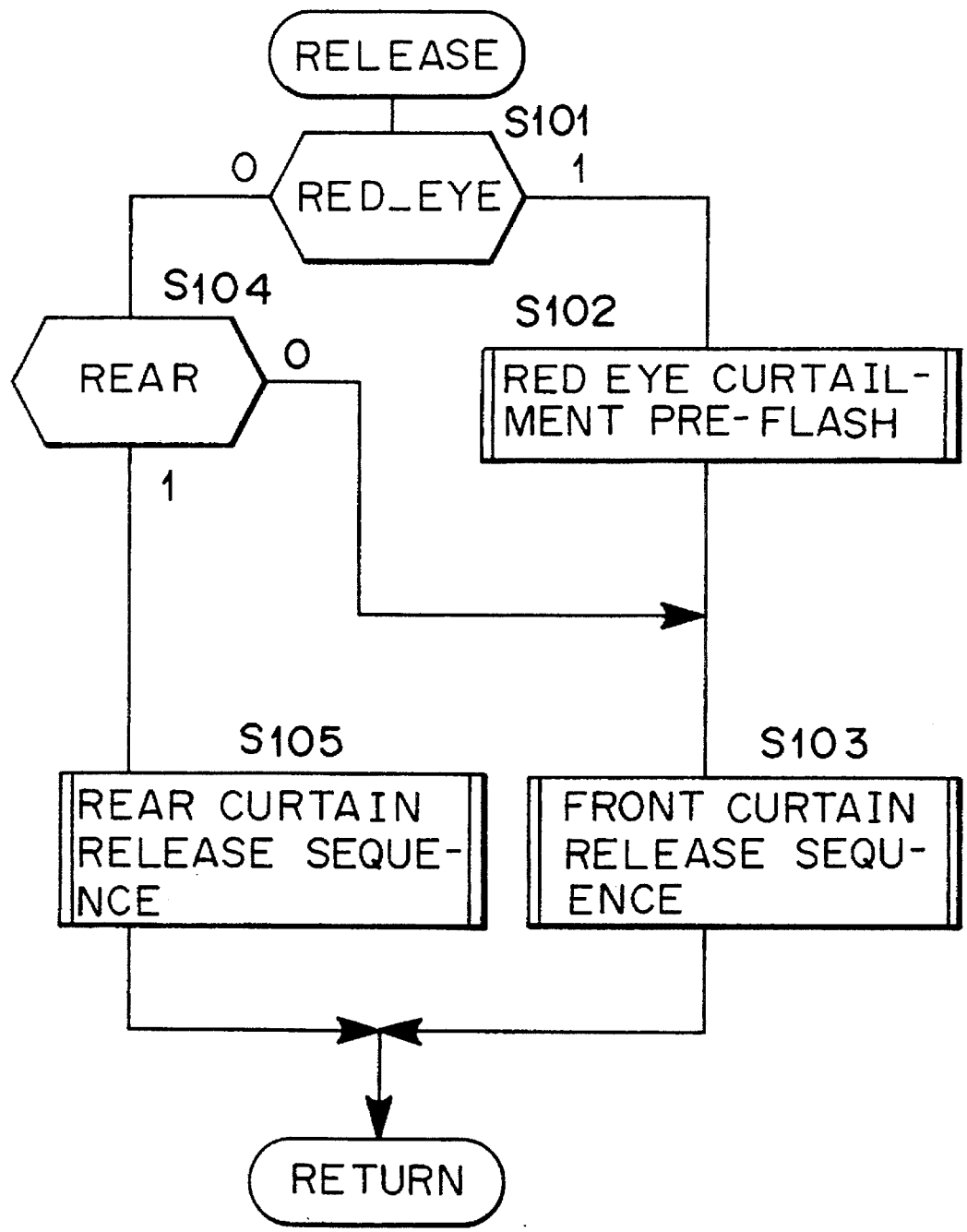
FIG. 2 is a flow chart which explains the operation of the first embodiment.

An explanation of the first embodiment of this invention is provided by means of the flow chart shown in FIG. 2.

When the release switch 15 is turned on, the program within the computer microcomputer 12, shown in FIG. 2, commences operation. Initially, in step S101, a determination is made as to whether or not the RED_EYE flag for the pre-flash is [1]. The RED_EYE flag is set to [1] on the instruction of the pre-flash command circuitry 11. When no command is given for the pre-flash, then it remains in [0]. Hereafter when the flag is in [1], it will be referred to as being 'flag on', and when in [0], it will be referred to as being 'flag off'.

When the RED_EYE flag is on, the software program will proceed to step 102, where the pre-flash is performed. Various formats have been proposed for the pre-flash, an execution of which is described as follows:

The camera's microcomputer 12 produces the pre-flash execution signal 3 times, at an interval of 300 ms. The execution signal is sent to the flash control circuitry 23 through the camera communication unit 14 of the camera body 10 and the flash communication unit 21 of the electronic flash 20. The flash control circuitry 23 flashes the discharge tube of the flash unit 24 by the specified amount of light in response to the mobilization signal. In other words, the pre-flash is performed 3 times at 300 ms intervals, causing the pupils of the (human) photographic subject to contract, making it difficult for there to be any red eye.

Next, in step S103, a sequence is followed for the release of the front curtain. Namely, the camera's microcomputer 12 releases the shutter through exposure control circuitry, not shown in the diagram, at the same time as which, when the motion of the forward curtain of the shutter has been completed, a command signal is sent to the synchronizing signal producing circuitry 13, from which the synchronizing signal is output. The synchronizing signal is input into the flash control circuitry 23 of the electronic flash 20 through each of the communication units 14 and 21. In response, the flash control circuitry 23 initializes the primary flash of the discharge tube of the flash unit 24. Following the discharge of a specified amount of light, the flash control circuitry cuts off the production of light from the discharge tube. In addition, the camera microcomputer 12 commences the motion of the rear curtain following the passage of a specified seconds of shutter speed.

On the other hand, if in step S101 a determination is made that the RED_EYE flag is off, then the program proceeds to step S104, where a determination is made as to whether or not the curtain synchronized photography rear flag REAR is on or not. The REAR flag is turned on when the rear curtain synchronized photography is issued by means of rear curtain synchronized photographic command circuitry 25. When a rear curtain synchronization command is not received, it remains off. The on/off state of the REAR flag is communicated to the camera microcomputer 12 through the flash microcomputer 22, and through each of the communication units 14 and 21.

In step S104, if a determination is made that the REAR flag is [0], then the program progresses to step S103, where the front curtain release sequence is executed. If, however, the REAR flag is determined to be [1] then in step S105, the rear curtain release sequence is executed.

In other words, the camera microcomputer 12 performs the shutter release in the same manner as referred to earlier, and at the same time, following the operation of the shutter's forward curtain, immediately prior to the motion of the rear curtain, a command signal is output to the synchronizing signal production circuit 13, and the synchronizing signal is output. By this means, the primary flash of the discharge tube of the flash unit 24 commences by means of the flash control circuitry 23, and after a specified amount of light has been produced, the production of light is terminated. Following steps S103 and S105, the program returns to its specific routine.

According to the chronology cited above, when commands for the pre-flash and the rear curtain synchronized photography are received simultaneously, only the pre-flash is executed in response to the release operation. Subsequently, ordinary forward curtain synchronization photography is accomplished. In other words, the rear curtain synchronized photography is prevented notwithstanding the presence of a command. By this means, there is no extension of the time gap between the pre-flash and the primary flash, as a result of which the amount of red eye can be satisfactorily curtailed and there is no misperception on the subject being photographed, i.e. human that the photographing may have been prematurely completed.

SECOND EMBODIMENT

Hereafter is provided an explanation of the second embodiment which operation effectiveness is accomplished by treating the electronic flash.

Figure 3:
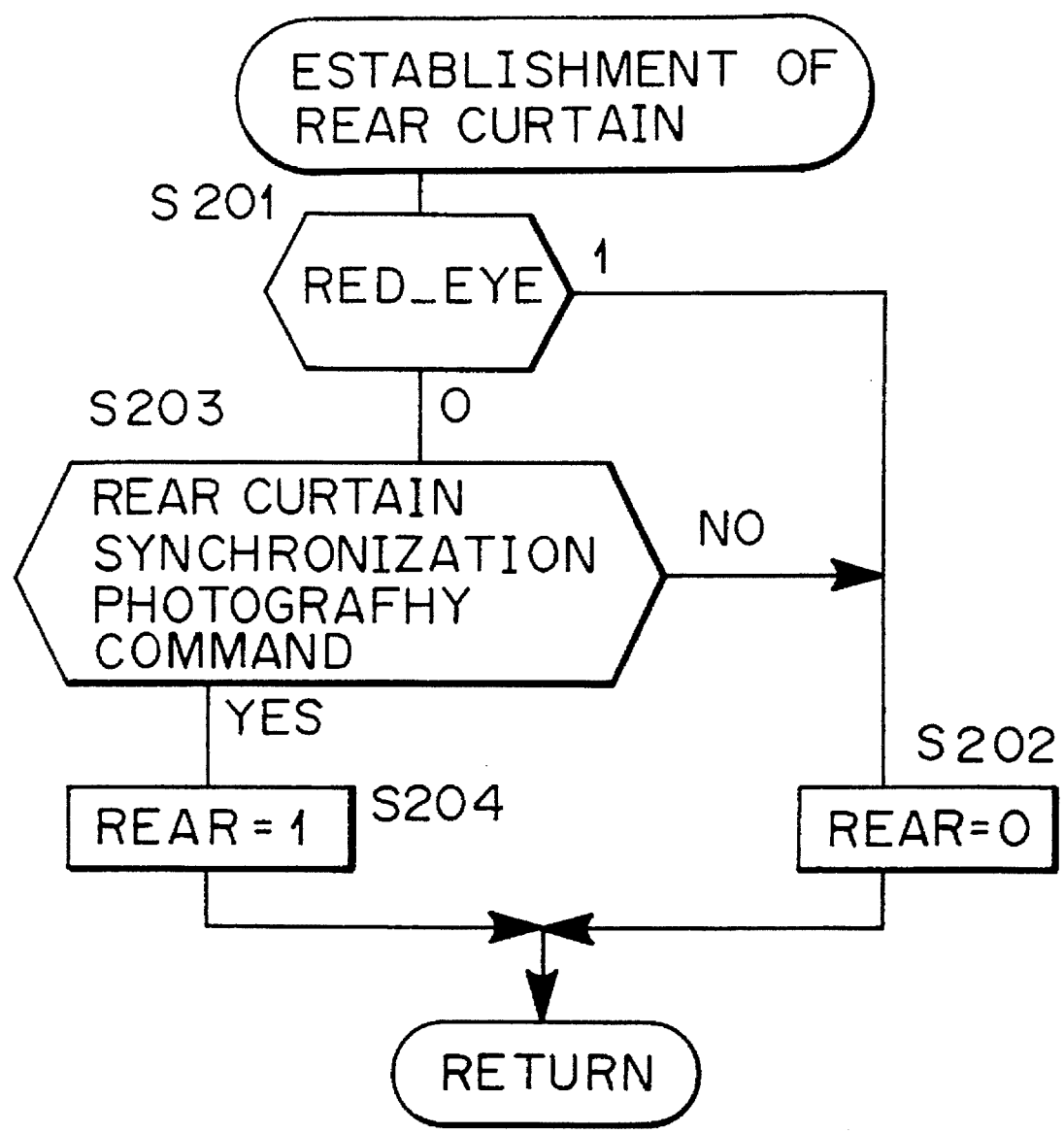
FIG. 3 is a flow chart which explains the operation of a second embodiment.

FIG. 3 is a block flow chart in which execution is accomplished periodically within the flash microcomputer 22. Initially, a determination of the RED_EYE flag is accomplished in step S201. The status of the RED_EYE flag is input into flash microcomputer 22 through communication units 14 and 21 from camera microcomputer 12. In step S201, if it is determined that the RED_EYE flag is in the on state, then in step S202 the REAR flag is forcibly turned off. When the RED_EYE flag is off, then the program progresses to step S203. In step S203, a determination is made as to whether or not a command is issued for the rear curtain synchronized photography by means of the rear curtain synchronizing photographic command circuitry 25. If it is affirmed, then in step S204, the REAR flag is turned on, and if it is not, then the program progresses to step S202.

Figure 4:
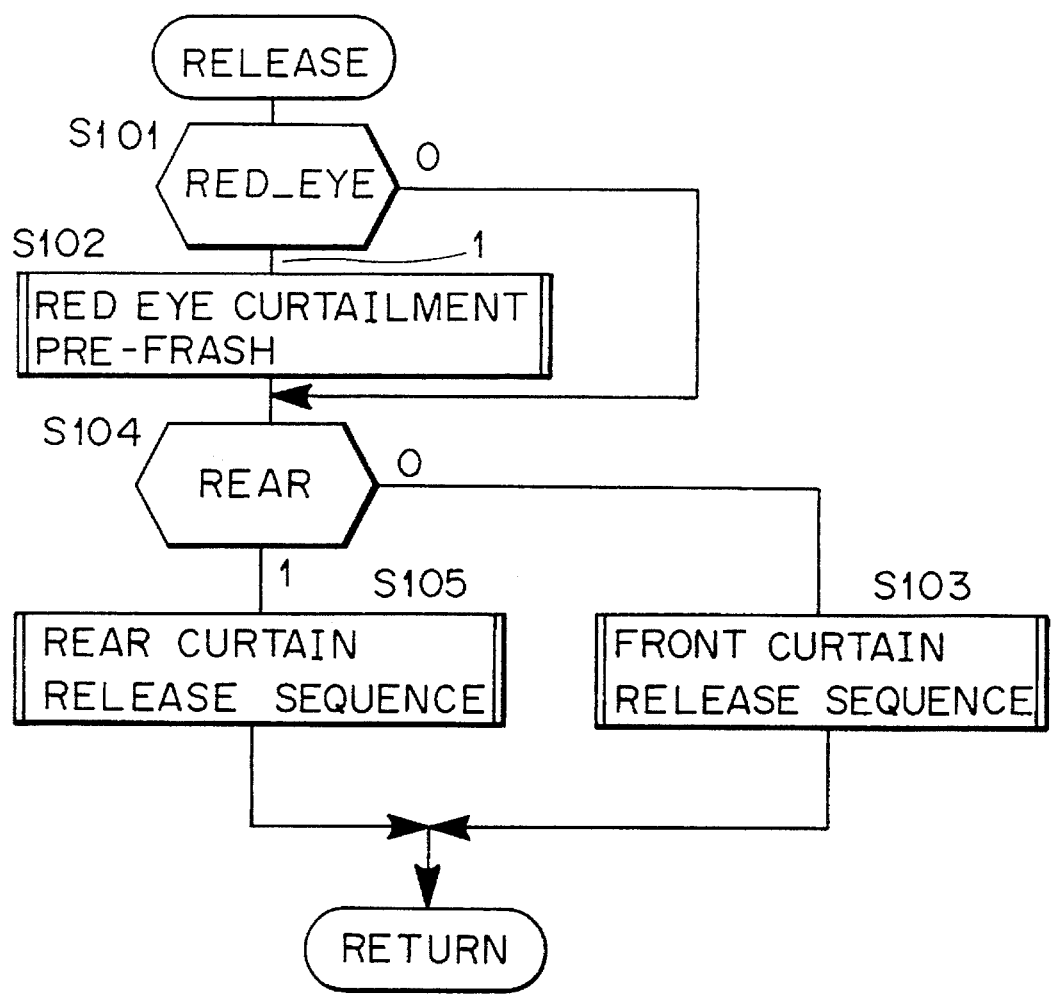
FIG. 4 is a flow chart which explains the operation of the release according to the second embodiment.

Incidentally, the treatment chronology of the camera microcomputer in this embodiment is handled in the same manner as the previous embodiment. Or the treatment chronology can be accomplished in the manner shown in FIG. 4. In FIG. 4, the same marks apply as were applied in FIG. 2, thus abbreviating the required explanation.

Even by means of the above embodiment, when the pre-flash and the rear curtain synchronized photography are commanded simultaneously, the pre-flash is performed. However, the rear curtain synchronized photography is prevented, resulting in the same operational effectiveness.

With the above embodiment, when the pre-flash and the rear curtain synchronized photography are commanded simultaneously, then the pre-flash may be given precedence. However, the rear curtain synchronized photography can also be given precedence.

THIRD EMBODIMENT

Next, an explanation is provided with respect to a third embodiment of this invention. According to the above embodiment, when both the pre-flash and the rear curtain synchronized photography are commanded simultaneously, the pre-flash takes precedence. Or, an example may be cited where the rear curtain synchronized photography may take precedence. However, with this embodiment an example is given wherein priority may be established for one of the pre-flash and the rear curtain synchronized photography which is set earlier.

Figure 5:
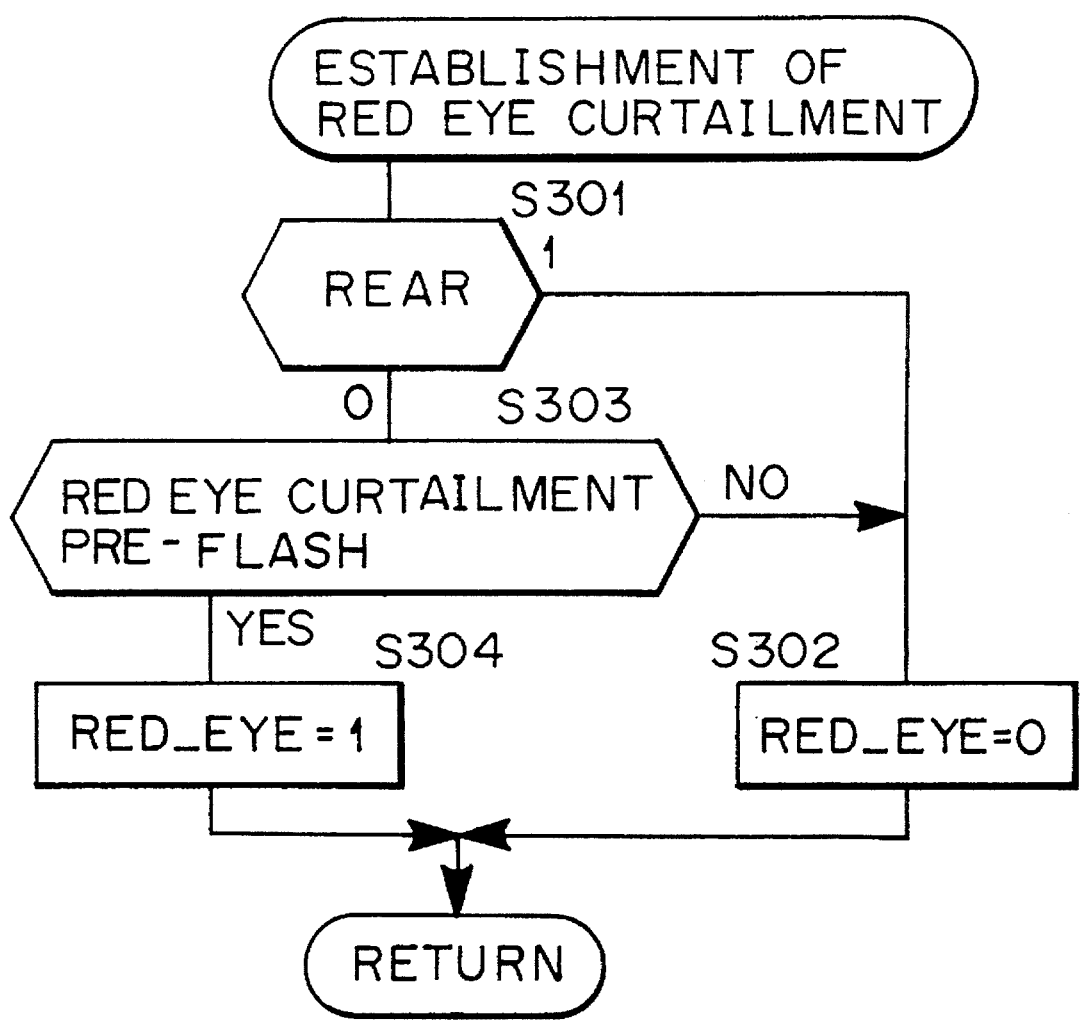
FIG. 5 is a flow chart which explains the operation of a third embodiment.

FIG. 5 shows a flow chart of a program which is performed periodically within the camera microcomputer 12 when the release switch 15 is in the off position. In step S301, when a determination is made that the REAR flag is on, then in step S302, the RED_EYE flag is turned off. When the REAR flag is off, then in step S303, a determination is made as to whether or not the pre-flash has been given a command. If affirmed, then in step S304, the RED_EYE flag is turned on, and if it is not, then the program progresses to step S302.

If the treatment shown in FIG. 5 and the treatment shown in FIG. 3 are combined, then control is exercised over either the pre-flash or the rear curtain synchronized, depending upon which command is set earlier. In this case, the subsequent command control is prevented. Furthermore, the chronology at the time of operational release in this embodiment may also be accomplished in the manner shown in FIG. 4.

FOURTH EMBODIMENT

Figure 6:
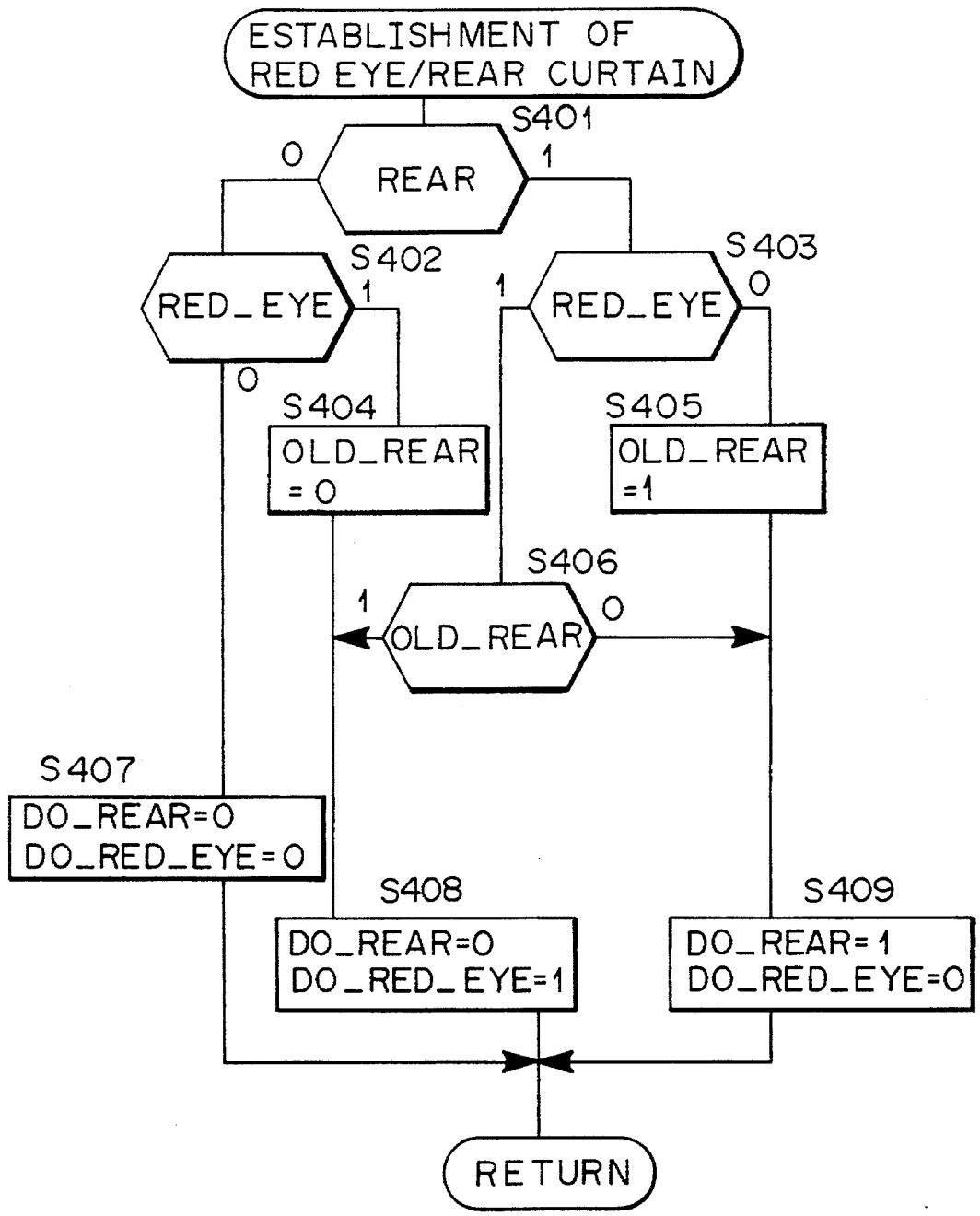
FIG. 6 is a flow chart which explains the operation of a fourth embodiment.

Next, an explanation is provided with respect to a fourth embodiment of this invention with reference to FIG. 6.

With this embodiment, precedence is given to the latter command which is given to either the pre-flash, or the rear curtain synchronized photography.

FIG. 6 shows a flow chart of a program which is periodically executed in the camera microcomputer 12 when the release switch 15 is off. In step S401, if a determination is made that the REAR flag is off, then the program progresses to step S402. If a determination is made that the RED_EYE flag is also off, then the program progresses to step S407. In step S407 both the DO_REAR flag and the DO_RED_EYE flag are mutually off. In this instance, although it is not depicted in the drawings, when the DO_REAR flag is on, rear curtain synchronized photography is accomplished in a release routine, and when it is off, front curtain synchronized photography is accomplished. In addition, when the DO_RED_EYE flag is on, then the pre-flash is performed in a release routine, but when in the off position this does not occur.

In step S402, if a determination is made that the RED_EYE flag is on, then in step S404, the OLD_REAR flag is turned off. The OLD_REAR flag shows which of the rear curtain synchronized photography or the pre-flash receives the prior instruction. Therefore, when it is on, the rear curtain synchronized photography command takes priority, and when off, the pre-flash command takes priority.

Next, in step S408, the DO_REAR flag is turned off, and the DO_RED_EYE flag is turned on.

On the other hand, in step S401, a determination is made as to whether or not the REAR flag is on, in which case the program progresses to step S403. In this instance, if it is determined that the RED_EYE flag is off, then the program progresses to step S405. In step S405, the OLD_REAR flag is turned on, and then, in step S409, the DO_REAR flag is turned on, and the DO_RED_EYE flag is turned off.

In addition, in step S403, if it is determined that the RED_EYE flag is on, then in step S406, a determination is made with respect to the OLD_REAR flag, and if the OLD_REAR flag is off, then the program progresses to step S409, and if it is on, the program progresses to step S408, respectively.

According to this chronology, priority is given to the latter of the commands given to the pre-flash or the rear curtain synchronized photography. In other words, commands are given first to the pre-flash, and then to the rear curtain synchronized photography, then the pre-flash is prevented, and the rear curtain synchronized photography is accomplished. On the other hand, if the rear curtain synchronized photography is given a command, followed by a command to the pre-flash, then the rear curtain synchronized photography is prevented, and the pre-flash is performed.

FIFTH EMBODIMENT

With rear curtain synchronized photography, since the primary flash immediately proceeds the motion of the rear curtain, then the timing of the primary flash becomes delayed as the shutter speed is extended. Therefore, an explanation will be given for a fifth embodiment in which, when a command is given for rear curtain synchronized photography, then the shutter speeds are shortened, and the effective reduction of red eye is accomplished.

Figure 7:
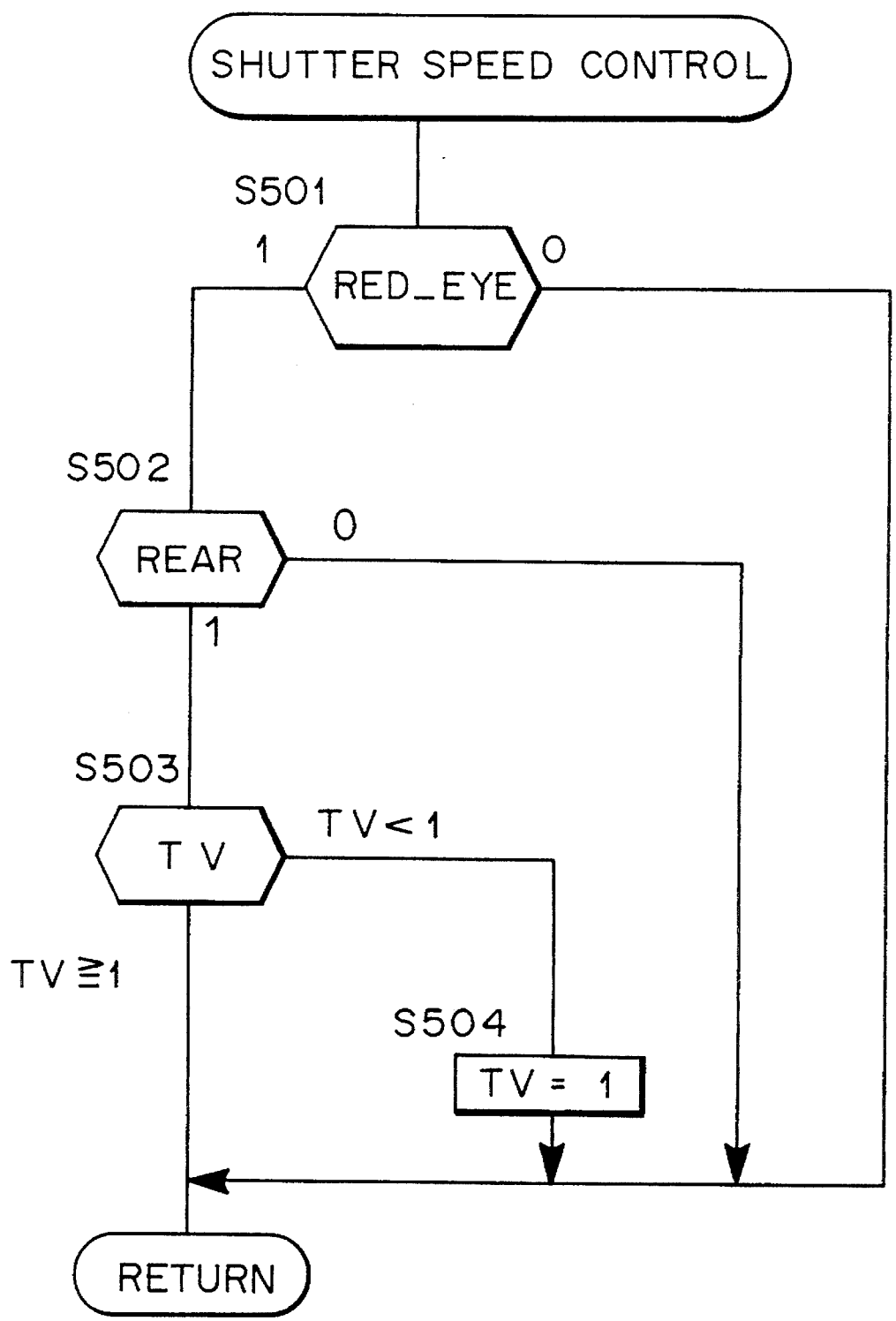
FIG. 7 is a flow chart which explains the operation of a fifth embodiment.

FIG. 7 shows a flow chart of a program which periodically is executed within camera microcomputer 12 when the release switch 15 is turned off. First of all, in step S501, a determination is made as to whether or not the pre-flash RED_EYE flag is [1] or not. If the RED_EYE flag is on, then the program progresses to step S502, where a determination is made as to whether or not the rear curtain synchronized photography flag is on or not. In step S502, if it is determined that the REAR flag is off, then there is a return to the main program; whereas if it is determined to be on, then in step S503, a determination is made with respect to the shutter speed Tv. As indicated earlier, the shutter speed Tv is calculated within camera microcomputer 12, or may be manually established by means of the photographer. If Tv is greater than or equal to 1, then there is a return to the main program; whereas if Tv is less than 1, then in step S504, Tv=1, and there is a return.

In this instance, Tv represents the apex value, and the actual shutter speeds are such that when Tv=1, the actual shutter speed is ½ second. When Tv is greater than or equal to 1 then the actual shutter speed becomes a relatively high speed greater than one-half second. When Tv is less than 1 then the actual shutter speed drops to the relatively low time of greater than one-half second.

In other words, according to the above chronology, when the pre-flash used to curtail red eye and the rear curtain synchronized photography are mutually commanded, then even if the shutter speed is established to be slower than a one-half second it is forcible changed to one-half second.

In the fifth embodiment as a program flow chart which starts in response to a release switch in the on position, the flow chart previously explained in FIG. 4 can be used.

According to the fifth embodiment, when both the pre-flash and the rear curtain synchronized photography are mutually commanded, then the pre-flash is performed in response to the release switch 15 in the on position, subsequent to which the rear synchronized photography is accomplished in accompaniment with a controlled reduction in the shutter speed. Since the time of shutter speed of the rear curtain synchronized photography does not exceed one-half second, as described above, there is not much of a gap between the pre-flash and that of the primary flash, then flash photography can be accomplished before the retina of the individual being photographed which has been closed by the pre-flash is opened again. Furthermore, in addition to obtaining an effective and satisfactory reduction in red eye, there will be no erroneous assumption on the part of the individual being photographed that the photography has been completed prior to the primary flash.

Furthermore, in accordance with the above, when shutter speeds are set to a level below one-half second, they are forcibly held to one-half second. However, in lieu of one-half second, shutter speeds may be set at a high level corresponding to a flash synchronized shutter speed.

SIXTH EMBODIMENT

FIG. 8 shows a sixth embodiment of this invention. Furthermore, the same step numbers apply as were assigned in FIG. 7.

Generally speaking, shutter time speeds which fall within the parameters of hand motions are manifest as inverse times relative to the focal length of the attached photographic lens. If a photograph is taken with a shutter speed which is slower than the shutter speed limits of hand motion, then there is a great probability that disadvantage due to hand movements will occur. In such a case, with this embodiment, if commands are given to both the pre-flash and the rear synchronized photography, then the shutter speeds are such that they have values which are roughly equal to the inverse value of the focal length of the photographic lens.

In FIG. 8, if it is determined in step S502 that the REAR flag is on, then the program progresses to step S506, where a determination is made as to whether or not the established shutter speed or time second Tv is lower than the inverse value of the focal length of the attached photographic lens. The focal length of the photographic lens may be read in from the ROM within the lens.

If in step S506 a negative determination is made then there is a return, and if there is an affirmation, then in step S507 the shutter speeds are established as the inverse value of the focal length of the lens, and there is a return. For example, when a lens is attached having a focal length of 70 mm then even if the initially established shutter speed is lower than 1/70 of a second, it is changed to 1/70 of a second. Therefore, even in this instance, there is no extension of the time from the pre-flash to the primary flash, and effective operational results noted above can be obtained, while preventing poor quality pictures resulting from hand movement.

Furthermore, in each of the above embodiments, the examples shown have been concerned with an external electronic flash which was attached to the camera. However, this invention may also be appropriately applied to cameras which contain an internal flash. In addition, each of the above examples is given to the rear curtain synchronized photography made of a focal plane shutter in a single lens reflex camera. However, this invention can also be appropriately applied to rear synchronized photography in which utilization is made of a leaf type lens shutter. Accordingly, this invention may also be appropriately utilized with lens shutter cameras. It is also possible for rear curtain synchronizing commands to be issued from the camera body.

We claim:

1. A camera capable of photographing with flash comprising:
   a red eye phenomenon reduction emission means for performing a pre-light emission to curtail red eye;
   a pre-light emission command means for commanding the pre-light emission;
   a pre-light emission control means for controlling said red eye phenomenon reduction emission means so that pre-light emission is performed prior to a shutter release when commanding the pre-light emission;
   a rear synchronized photography command means for commanding rear synchronized photography;
   a primary flash control means for controlling flash so that when the rear synchronized photography is commanded, in response to the shutter release, a primary flash is performed with a first timing, and when there is no command for rear synchronized photography, the primary flash is performed with a second timing which is faster than the first timing in response to the shutter release; and
   a setting means for establishing a high speed which is faster than a specified shutter speed, when a command is given for both the pre-light emission and the rear synchronized photography.

2. A camera according to claim 1, wherein said high speed is a time period in which a pupil closed by the pre-light emission continues to demonstrate effective red eye curtailment.

3. A camera according to claim 1, wherein said high shutter speed is a flash synchronized shutter speed.

4. A camera according to claim 1, wherein said high shutter speed roughly corresponds to the inverse value of a focal length of a photographic lens of said camera.

5. A camera according to claim 1, wherein said high shutter speed is such that photographs can be taken without an adverse influence of hand motion.

6. A camera capable of photographing with flash comprising:
   a red eye phenomenon reduction emission means for performing a pre-light emission used to curtail red eye;
   a pre-light emission command means for commanding a pre-light emission;
   a pre-light emission control means for controlling said red eye phenomenon reduction emission means so that the pre-light emission is performed prior to a shutter release when the pre-light emission is commanded;
   a rear synchronized photography command means for commanding a rear synchronized photography;
   a primary flash control means for controlling flash so that a primary flash is performed with a first timing in response to the shutter release when said rear synchronized photography is commanded, and the primary flash is performed with a second timing which is faster than the first timing in response to the shutter release when no rear synchronized photography is commanded; and
   a prevention means for preventing the primary flash with the first timing from occurring by means of said primary flash control means when both the pre-light emission and the rear synchronized photography are commanded.

7. A camera capable of photographing with flash comprising:
   a red eye phenomenon reduction emission means for performing a pre-light emission used to curtail red eye;
   a pre-light emission command means for commanding a pre-light emission;
   a pre-light emission control means for controlling said red eye phenomenon reduction emission means so that the pre-light emission is performed prior to a shutter release when the pre-light emission is commanded;
   a rear synchronized photography command means for commanding a rear synchronized photography;
   a primary flash control means for controlling flash so that a primary flash is performed with a first timing in response to the shutter release when said rear synchronized photography is commanded, and the primary flash is performed with a second timing which is faster than the first timing in response to the shutter release when no rear synchronized photography is commanded; and
   a prevention means for preventing the primary flash with the first timing by means of said primary flash control means when the rear synchronized photography is commanded after the pre-light emission is commanded, and for preventing the pre-light emission by means of said pre-light emission control means when a command is given for the pre-light emission after a command is given for the rear synchronized photography.

8. A camera capable of photographing with flash comprising:
   a red eye phenomenon reduction emission means for performing a pre-light emission used to curtail red eye;
   a pre-light emission command means for commanding a pre-light emission;
   a pre-light emission control means for controlling said red eye phenomenon reduction emission means so that the pre-light emission is performed prior to a shutter release when the pre-light emission is commanded;
   a rear synchronized photography command means for commanding a rear synchronized photography;
   a primary flash control means for controlling flash so that a primary flash is performed with a first timing in response to the shutter release when said rear synchronized photography is commanded, and the primary flash is performed with a second timing which is faster than the first timing in response to the shutter release when no rear synchronized photography is commanded; and
   a prevention means for preventing the pre-light emission from being performed by means of the pre-light emission control means when a command is given for the rear synchronized photography after the pre-light emission is commanded, and for preventing the primary flash from being performed with the first timing by means of said primary flash control means when a command is given for the pre-light emission after a command is given for the rear synchronized photography.

* * * * *